Patented Nov. 16, 1948

2,453,752

UNITED STATES PATENT OFFICE 2,453,752

EMULSION ADAPTED FOR COATING TEXTILES

Fred G. La Piana, Forest Hills, N. Y., and Herman S. Bosland, Paterson, N. J., assignors to Stein, Hall & Company, Inc., New York, N. Y., a corporation of New York No Drawing. Application November 2, 1940, Serial No. 364,036

3 Claims. (Cl. 260—8)

The present invention relates to methods and compositions suitable for use in printing textile materials, and, more particularly, to emulsions and their uses and preparation, having improved pigment carrying and binding properties as well as suitable viscosity and other characteristics adapting them to be used in the printing of textile materials.

The art long has sought a method to fix pigmentary colors solidly on fabrics. The pigmentary colors, as distinguished from dyes, are insoluble coloring materials, and are generally inert and fast to degradation agents such as sunlight and air as well as common chemicals to which textiles are subjected, for example, washing powders such as are used in laundering. As a consequence, fabrics printed with pigments may be expected to show a marked resistance to fading over long periods of time and under ordinary usage conditions. Pigments, in general, have a high covering power and are relatively inexpensive to produce, whereby they may be used economically for coloring textile fabrics. Moreover, pigmentary colors impart a luster and brilliance to the printed fabric which cannot be equalled by means of dyes or other known coloring substances. The pigments suitable for printing on textiles are obtainable in a wide range of colors and tints whereby the printer has available a wide selection of materials having substantially uniform permanency. Furthermore, as pigments exhibit no tendency to spread by capillary action, they may be used to reproduce delicate patterns and designs with very fine engravings.

Attempts made heretofore to use pigments for coloring textiles have been unsuccessful. For example, it has been proposed to incorporate thickening agents such as gum, starch, dextrine, and other water soluble materials such as proteins, with pigments to form a color paste which, for example, may be printed directly on textile fabrics in the usual printing processes. The printed textiles are then dried, generally with heat, which causes the thickening agents to adhere to the fabric and thus mechanically fix the pigments thereon. The thickening agents described above being water soluble, do not act as a permanent binder for the pigments on the fabric, particularly when the fabric is laundered.

As the pigments do not themselves adhere with any appreciable strength to the fabric, the dissolution or disintegration of the binder causes the pigments to be freed and dislodged from the fabric, thereby removing the color from the fabric. Such process is limited to materials that are not intended to be laundered and so is of very limited application.

Some attempts have been made to form a more permanent pigment binder by the use of cellulosic varnishes, such pigment colored fabrics being known to the trade as "lacquered fabrics." The fixing of the varnish, however, hardened the fabric to such a degree that the fabrics colored in this fashion were unsatisfactory for most uses. Moreover, printing with cellulose varnishes met with serious difficulties such as hardening of the varnish on the printing machinery, particularly in the engravings, which was difficult to remove by ordinary methods. The objectionable odor of evaporated solvent, and unsatisfactory operation of the doctor blade in intaglio printing, are other difficulties encountered.

In accordance with this invention, it is possible to apply insoluble pigments on textile fabrics so that the fabric will be characterized by a soft feel and will not crack or wear off by mechanical abrasion.

Moreover, if desired, the soft and pliable pigment containing film on the colored fabrics produced in accordance with this invention may be made water insoluble and hence resistant to dissolution by laundering and like treatment.

The pigment containing compositions which may be utilized for printing on textile fabrics in accordance with this invention, however, preferably are water soluble or contain water soluble ingredients at the time of application to the fabric and may be diluted or thinned readily with water to provide the viscosity desired for printing or like coloring operations and are readily washed from the printing machinery, etc., thereby avoiding fouling of the apparatus used.

The compositions which may be used in accordance with this invention may be incorporated with any of the pigments available for textile coloring, and do not detract from the brilliance, permanence and other inherent characteristics thereof.

The pigment containing compositions may be applied to the fabrics by means of any of the usual fabric-coloring methods, such as the rotary intaglio printing method, or stencilling, and may be applied successfully to all types of fabrics including cotton, viscose or acetate rayon, silk, wool or mixed fabrics.

The setting of the pigment binder on the colored fabric, if desired, may be accomplished in a variety of ways such as by the application of heat or by the use of chemical reagents.

The application of the pigment containing compositions to fabrics may be combined with other textile processing, printing, dyeing or other coloring operations, thereby providing a wide range of possible products and avoiding duplication of handling and processing.

In accordance with the invention, any desired pigment or mixture of pigments may be selected for incorporation in the coloring compositions. Viewed in its broadest aspect the composition in which the pigment or pigments are dispersed is an oil in water emulsion in which the outer or continuous phase comprises a water solution or dispersion of water soluble resin forming ingredients or a water soluble resin or both, capable of being rendered water insoluble after application, and the inner or dispersed phase comprises an evaporative water-immiscible organic solvent which, preferably, has dispersed therein an oil-soluble rubber-like substance of the type described more particularly hereinafter.

The above referred to substances with the pigments are believed to be the essential ingredients of the printing composition of this invention, but other materials such as emulsifying, viscosity and surface tensioning modifying agents may be added, if desired, as discussed more particularly hereinafter.

The water soluble resinous or resin forming ingredients which may be used to form the compositions of this invention may be selected from a wide range of materials. It is essential only that the resin when formed will have the property of adhering to the printed fabric, thereby fixing the pigment thereon. It is desirable, however, to select a resin or resin forming ingredients of the type which can be rendered water insoluble after being printed on the textile fabric. As an example of a preferred type of resinous ingredient, urea and formaldehyde may be used, or water soluble condensation products of urea and formaldehyde, for example, a urea-formaldehyde condensation product that has been permitted to condense to the dimethylol urea stage.

In general, soluble protein, for example, gelatin and other water-soluble albumins, or solubilized protein of the alkali-soluble, acid-precipitable type, such as casein from milk, soy-bean protein, and water insoluble albumins are also desirable ingredients of the resin forming phase of the emulsion. The protein also may be in a soluble resinified form adapted to be rendered insoluble on the fabric. When an alkali-soluble, acid-precipitated protein is utilized, it is rendered soluble in the aqueous phase of the emulsions by means of a protein solubilizing agent. For example, ammonia or derivatives of ammonia, i. e., aliphatic or aromatic amines or alkylolamines, for example, triethanolamine or monoethanolamine, may be used. When ammonia or monoethanolamine is used, a smaller amount is required than in the case of triethanolamine because of its greater alkalinity. Other solubilizing agents, such as alkaline salts may be used. It is to be understood that any of the above solubilizing agents may be used alone or in admixture with each other. The proportions will depend to a large extent on the particular ingredients selected, their alkalinity and the nature of the emulsion desired.

When the compositions include a protein it is desirable to add an aldehyde, such as formaldehyde or acrilic aldehyde, for reaction with the protein or proteinate to modify the protein and produce materials of a resinous nature. The resinous materials so produced, while water-soluble in the emulsion composition, may be rendered water insoluble after application to the printed fabric, for example, by means of heat or chemical treatment. As a particular example, improved results have been obtained by the use of a resinous product comprising the material resulting from the addition of formaldehyde to an aqueous dispersion of urea and a protein, such as casein solubilized with an alkylolamine, such as triethanolamine. It is believed that the formaldehyde reacts with the protein-alkylolamine reaction product, and the urea forming a resinous substance which is soluble in water. This is evidenced by the fact that as the formaldehyde is added, the protein is at first precipitated, but upon continued addition of formaldehyde the precipitate redissolves.

The material dissolved in the inner dispersed or oil phase of the emulsions prepared in accordance with this invention are the oil soluble, flexible, rubber-like substances which are believed to have the property of plasticizing and rendering flexible the resinous film printed on the printed fabric, thereby avoiding the hard characteristics of insoluble pigment binding coatings of the prior art. For convenience, this material is referred to hereinafter as "an oil soluble flexible plasticizer having rubber-like characteristics." It is possible, however, that these substances may exert some pigment-binding action of their own. Among the substances which may be utilized, for example, are the natural rubbers and derivatives thereof, such as vulcanized rubber. Other suitable materials are the so-called "factice" or rubber substitute compounds which comprise the wholly or partially vulcanized or sulfurized oils, such as sulfurized rape-seed, linseed and other unsaturated vegetable oils. It is preferred that the material selected have rubber-like characteristics or be flexible, soft and pliable, as distinguished from hard, tough or brittle characteristics such as possessed by hard rubber. On the other hand, it also is generally preferable for convenience to avoid the extremely sticky rubber or rubber-like materials of the type described, such as liquid latex. It is intended that the above plasticizers shall include all types of rubber, such as crude, reclaimed, or wholly or partially vulcanized, etc., as well as all types of rubber substitutes such as gutta-percha, balata, or factice compositions which may have the desired viscosity characteristics. The particular material selected is not critical and it will be apparent to one skilled in the art that a great number of substitutes or mixtures are possible.

When colored pigments are to be used, it is preferred to utilize the more economical factice compounds, such as vulcanized rape-seed oil. When white pigments are to be used, it is necessary to greatly increase the pigment concentration in the emulsion for good covering characteristics, and in such cases, it has been found to be desirable to utilize a rubber derivative.

It is believed to be possible to use any water immiscible organic solvent for the rubber-like material to form the printing emulsions of this invention. For example, the inner or dispersed phase of the emulsion may comprise hydrocarbon solvents, i. e., petroleum derivatives, such as kerosene, gasoline, and naphtha, or coal tar derivatives such as xylol, phenol, toluol, etc. Carbon tetrachloride may also be used. In general, any cyclic or aliphatic hydrocarbon solvent or mixtures thereof having a boiling point in the range of about 50° to 250° C. is preferred. Particular examples of such solvents are the products known to the trade as "Sunoco Spirits," a solvent of petroleum origin, and "Solvesso," a solvent of coal tar origin. After the fabrics have been colored with the emulsions prepared in accordance with this invention it is preferred to volatilize the organic solvent, for example, by means of heat. It is believed that the solvent prior to its evaporation may assist in binding the rubber or rubber-like ingredients but, in general, it does not have any substantial effect upon the final pigment containing film produced on the printed fabric. The amount of organic solvent to be added to the emulsion should be sufficient to dissolve substantially all of the rubber or rubber-like substances used.

The emulsions of this invention may be used directly or used with a starch dispersion. In some cases it is desirable to add natural gum to the water phase in order to thicken the emulsion. The form of the starch or gum added is not critical and is generally gelatinized, or is preferably of a modified form. Desirable effects have been obtained, for example, by the addition of an acylated starch. When urea or urea and formaldehyde is present in the water phase, it is believed that a reaction may take place between the starch and the urea, or starch and dimethylol urea which insolubilizes the starch upon the textile.

In accordance with the invention, it may be desirable to impart improved and desirable characteristics to the emulsion by the use of emulsion facilitating and modifying agents, as aforesaid, such as sulfonated or sulfated oils and alcohols, or any of the known interface modifying agents. A specific example of a sulfonated higher fatty alcohol which may be used satisfactorily is the products known to the trade as "Triton W-30." Thinning agents of the higher boiling point alcohol, ester, or ether type, such as octyl alcohol, may be utilized.

The emulsions of this invention may be prepared by dissolving the oil-soluble rubber-like material in the water immiscible organic solvent, preferably with the addition of heat, and thereafter emulsifying the solution with a water dispersion of the resin or resin forming ingredients. The viscosity of the resulting emulsion will be determined to a great extent by the proportion of water and water immiscible organic liquid. It is desirable, from a practical standpoint to incorporate less than the desired amount of water in the initial composition and thereafter the emulsion may be thinned to any desired viscosity by the addition of water, since the water comprises the outer or continuous phase of emulsion. After the emulsion has been prepared the selected pigment in the amount required may be dispersed therethrough. After adjustment of the viscosity characteristics of the emulsion in the manner set forth above, or the addition of starch or gums if desired, the compositions are ready for coloring textile fabrics by means of any of the customary printing or like processes.

The proportions of the several ingredients may vary over a wide range depending upon the viscosity of the composition desired and the particular use to which it is to be put. In general, the proportions will fall within the following ranges although, in certain instances, one or more of the ingredients may be somewhat outside this range.

| | Parts by weight |
|---|---|
| Water | 3 to 50 |
| Water soluble resin or resin forming ingredients, including protein | 7 to 70 |
| Water immiscible organic solvent | 5 to 70 |
| Oil soluble rubber-like substance | 3 to 30 |

In those instances when it is desired to utilize a resin or resin forming ingredients comprising the reaction products of formaldehyde with an aqueous dispersion of a protein solubilized with an alkaline substance and urea, the following ranges, though not critical, are preferred:

| | Parts by weight |
|---|---|
| Water immiscible organic solvent (depending on the amount of the rubber-like material used) | 5 to 70 |
| Oil soluble rubber-like material | 3 to 30 |
| Water | 3 to 50 |
| Protein | 2 to 25 |
| Protein solubilizing material (depending on amount and nature of protein) | 0 to 25 |
| Urea | 2 to 25 |
| Aldehyde | 3 to 20 |
| Emulsifying, viscosity and surface tension modifying agents (if used) | .01 to 10 |

In order that my invention may be more readily understood, reference may be had to the following specific examples of preferred embodiments of the invention which are given by way of illustration only and are not to be construed as a limitation upon the scope of the invention, as described heretofore.

*Example I*

| | Range | Preferred Amount |
|---|---|---|
| | | Parts by weight |
| Urea | 3 to 10 | 3.52 |
| Water | 25 to 55 | 51.37 |
| Casein | 3 to 10 | 3.75 |
| Triethanolamine | 1.8 to 6 | 2.50 |
| Formaldehyde | 3 to 20 | 6.26 |
| Stearic acid | .5 to 2 | 0.98 |
| Sunoco Spirits | 10 to 30 | 21.90 |
| Vulcanized rapeseed oil | 3 to 30 | 4.22 |
| Acetylated starch | 2 to 10 | 2.75 |
| Dimethylol urea | 2 to 10 | 2.75 |

The stearic acid is dissolved in the triethanolamine which is added with the casein to the water and mixed. The urea is then added and the substances are again thoroughly mixed by a suitable stirring device. Thereupon, the formaldehyde is added slowly with constant stirring. The vulcanized rapeseed oil is dissolved in the Sunoco Spirits and thereafter is emulsified with the aqueous composition first prepared. The dimethylol urea and acetylated starch are mixed by dissolving them in water, preferably with heat, and thereupon are added to the emulsion. The above order of mixing the ingredients is not critical, being given by way of example only, and other orders may be used. The final product is an oil in water emulsion to which may be added the pigments desired in the amount required for good overage of the fabric. The viscosity of the oil in water emulsion may be regulated by varying the characteristics of the outer continuous water phase. Natural gum, for example, may be added to raise the viscosity, or the emulsion may be thinned by the addition of water alone.

*Example II*

|  | Range | Preferred Amount |
|---|---|---|
|  |  | Parts by weight |
| Vulcanized rapeseed oil | 10 to 25 | 16.67 |
| "Sunoco Spirits" | 5 to 15 | 8.33 |
| Casein | 10 to 25 | 14.90 |
| Triethanolamine | 2 to 15 | 8.87 |
| Urea | 15 to 25 | 18.55 |
| Water | 15 to 25 | 19.62 |
| Octyl alcohol | .01 to 1 | 0.16 |
| Formaldehyde | 10 to 20 | 12.90 |

In making the above composition the vulcanized rapeseed oil is dissolved in the "Sunoco Spirits" at elevated temperatures and after cooling is emulsified with a dispersion of the remaining ingredients of the composition. The dispersion is made by dispersing the casein in the water, triethanolamine and urea and adding the octyl alcohol and formaldehyde thereto.

The emulsion so formed also is effective in the printing of direct and acid dyestuffs, when added to starch or gum paste in the amount of 5% to 15%. It has been found that fabrics which have been printed with dye color pastes utilizing the above described composition may be steamed sufficiently to fix the color in the fabric in a period of time in the neighborhood of 6 to 8 minutes. Heretofore when utilizing starch paste, it has been necessary to steam the fabric for about 40 minutes in order to secure the necessary fixing of the color. In addition, it has been found that the fabric can be washed at a low temperature without bleeding to obtain a soft and woolly hand.

The above composition is also particularly suitable for the finishing of spun rayons to obtain an improved soft and woolly hand. When used for finishing, the composition may be diluted with water to any extent desired depending upon the amount of finish wanted.

The emulsions of this invention when mixed with a suitable amount of insoluble pigment may be applied to the fabric in any conventional manner, such as by engraved rollers and the like. If desired, colors may be applied to the fabrics uniformly on their surface by dipping the fabric in the pigment containing emulsion or by coating the fabric therewith by any conventional coating means. After the fabric is printed or otherwise colored, it may be dried and finished in accordance with the usual practice. When the emulsions of this invention contain a resin or resin forming ingredient which may be rendered insoluble on the fabric, after being applied thereto, the insolubilizing of the resin may be accomplished in a manner necessitated by the type of resin present. In the case of emulsions containing resins produced by the reaction of formaldehyde on solubilized casein and urea, the coating may be insolubilized readily by heating the fabric to a temperature of at least 250° F. and preferably in the range of 250° to 280° F. Some mills have driers which generally heat the fabric to above 250° F., in which event the printed coating is insolubilized without the necessity of a separate intermediate drying operation. Insolubilizing of this type of resin also may be accomplished by treatment with an acid material. The type of acid utilized is not critical and may comprise, for example, the organic acids such as acetic acid and mineral acids, or acid salts. When the printing emulsions contain urea or a protein, or both, but no formaldehyde, it may be possible to insolubilize the coating by immersing or otherwise reacting the printed or otherwise emulsion coated fabric with an aldehyde such as formaldehyde.

The printing of textile fabrics with the emulsions of this invention may be utilized in overprinting or combined with the discharge printing. In overprinting the pigment containing emulsions are printed on the surface of the white fabrics or fabrics dyed to any type of color. In discharge printing the pigment containing emulsions have included therein some chemical which will discharge the color of an evenly dyed fabric. The discharge chemical in the emulsion bleaches the dye in the fabric at the points at which the emulsion is applied. The inclusion of the discharge agent does not deleteriously affect the emulsions or alter their action in any way.

The printing with pigment containing emulsions may be used with other operations, for example, the fabric may be printed with three colors, one being the pigment containing emulsion of the invention and the other two different types of dye, for example, vat dye and an acid dye. These colors, if desired, may be applied rapidly in consecutive fashion. If a vat dye is used, the fabric is generally aged in a steamer to develop the vat dye and this steaming would have the additional effect of insolubilizing the resin in the emulsion so that there is no necessity to cure it by a subsequent operation.

It will be apparent from the above examples, therefore, that the printing or coloring of textile fabrics with the pigment containing emulsions of this invention may be combined with any standard technique of printing or dyeing textiles and the resin ingredient may be insolubilized in a separate operation or as a part of the operations with which the printing is combined.

The compositions which are preferred and utilized, in accordance with the foregoing disclosure, are characterized by an emulsion form which renders the emulsions easy to use in accordance with conventional printing and coloring techniques. The emulsions of the oil in water type prepared in accordance with this invention are readily dilutible and may be washed from the printing mechanism including the engraving by means of water. Moreover, the emulsions have improved and desirable characteristics with respect to spreading viscosity and adherence properties which facilitate their application to textile fabrics.

It will be understood that other ingredients which are equivalents of those set forth may be used in preparing the emulsions and it is intended to include the said alternative equivalents in the scope of the following claims.

We claim:

1. A composition adapted to be used in textile coloring comprising a pigment dispersed in an emulsion in which the inner phase comprises a dispersion of a vulcanized vegetable oil in a water-immiscible organic liquid, and the outer phase comprises an aqueous dispersion of material comprising the product obtained by adding urea and an aldehyde to a protein dispersion, said material being capable of being formed into a water-insoluble resin.

2. A method of coloring textile fabrics which comprises applying to the fabric a water-insoluble pigment dispersed in an emulsion in which the inner phase comprises from 3 to 30 parts of a vulcanized vegetable oil dispersed in from 10 to 30 parts of a hydrocarbon solvent, and the outer phase comprises 25 to 55 parts of water, 3 to 20 parts of formaldehyde, 3 to 10 parts of casein, 1.8 to 6 parts of an alkylolamine, 3 to 10 parts of urea, and 2 to 10 parts of dimethylol urea, drying the fabric, and heating the fabric to a temperature of at least 250° F. to form an insoluble resin in situ on the fabric.

3. An emulsion adapted to be applied to textiles in which the inner phase comprises a dispersion of a vulcanized vegetable oil in a water-immiscible organic liquid, and the outer phase comprises an aqueous dispersion of material comprising the product obtained by adding urea and an aldehyde to a protein dispersion, said material being capable of being formed into a water-insoluble resin.

FRED G. LA PIANA.
HERMAN S. BOSLAND.

REFERENCES CITED

The following references are of record in the file of this patent:

UNITED STATES PATENTS

| Number | Name | Date |
|---|---|---|
| 1,787,239 | Fleischmann | Dec. 30, 1930 |
| 2,072,508 | Mahlman | Mar. 2, 1937 |
| 2,103,293 | Lippert | Dec. 28, 1937 |
| 2,123,152 | Rivat | July 5, 1938 |
| 2,211,959 | Maney | Aug. 20, 1940 |
| 2,229,549 | Carson | Jan. 11, 1941 |
| 2,229,882 | Binepfl et al. | Jan. 28, 1941 |
| 2,279,256 | Mark | Apr. 7, 1942 |
| 2,296,427 | Daniel et al. | Sept. 22, 1942 |
| 2,361,277 | Enderlin et al. | Oct. 24, 1944 |

FOREIGN PATENTS

| Number | Country | Date |
|---|---|---|
| 486,926 | Great Britain | June 9, 1938 |